R. E. BATES.
CONTROL DEVICE FOR MOTORCYCLES AND THE LIKE.
APPLICATION FILED NOV. 23, 1916.
1,323,814.
Patented Dec. 2, 1919.
2 SHEETS—SHEET 2.
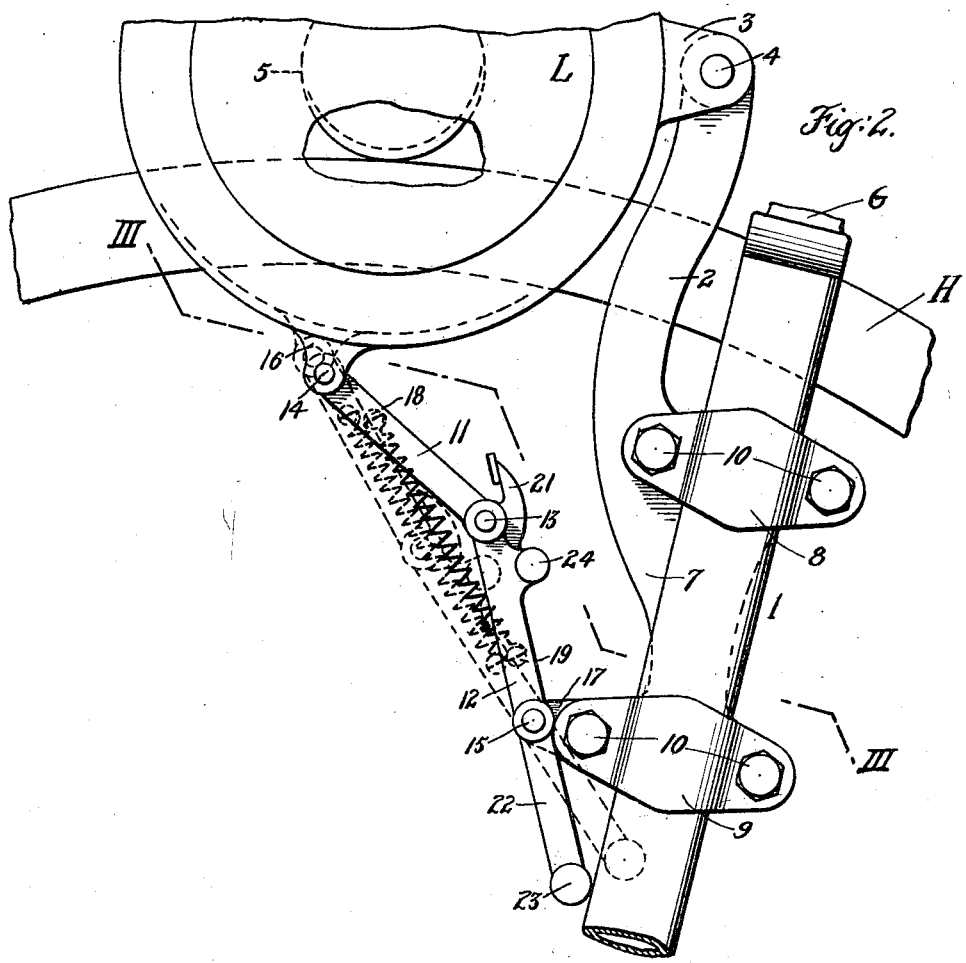
Fig. 2.
Fig. 3.
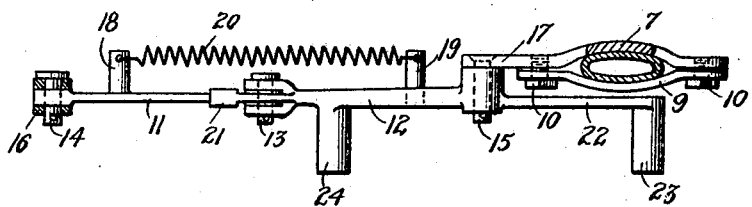
INVENTOR
Ralph E. Bates
BY
Charles H. Wilson
ATTORNEY

UNITED STATES PATENT OFFICE.

RALPH E. BATES, OF BROOKLYN, NEW YORK, ASSIGNOR TO OKAY MOTOR MANUFACTURING COMPANY, INC., OF BROOKLYN, NEW YORK, A CORPORATION OF NEW YORK.

CONTROL DEVICE FOR MOTORCYCLES AND THE LIKE.

1,323,814.     Specification of Letters Patent.     Patented Dec. 2, 1919.

Application filed November 23, 1916. Serial No. 132,967.

*To all whom it may concern:*

Be it known that I, RALPH E. BATES, residing at Brooklyn, in the county of Kings and State of New York, have invented certain new and useful Improvements in Control Devices for Motorcycles and the like, of which the following is a specification.

This invention relates to a control device for motorcycles and the like, and the particular object of the invention is to provide a simple means for controlling the drive mechanism in a motorcycle constructed in accordance with the provisions of my copending application Serial Number 94,556.

A more detailed object is to provide an improved form of mounting for the engine and to provide means associated therewith for conveniently and effectively controlling the driving connections between the motor and the bicycle wheel.

A further detailed object is to provide a toggle link mechanism, having a part adapted to be controlled by the rider's foot, whereby the motor may be swung into and out of driving relation with the bicycle wheel, further to provide means associated with the toggle link mechanism for forcefully urging the motor into driving connection with the wheel when the toggle links are in one of their positions, and further to adapt said means for holding the toggle links in their other position when desired.

A further object is to provide means whereby all of the above mentioned parts, together with the engine, may be adjustably connected to the frame of the bicycle so that they may be readily moved into properly adjusted relation with the bicycle wheel.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Fig. 2 is an enlarged view of a portion of the structure shown in Fig. 1, for illustrating the operation of the toggle links and associated parts; and Fig. 3 is a sectional view taken upon the plane of line III—III of Fig. 2.

Figure 1:
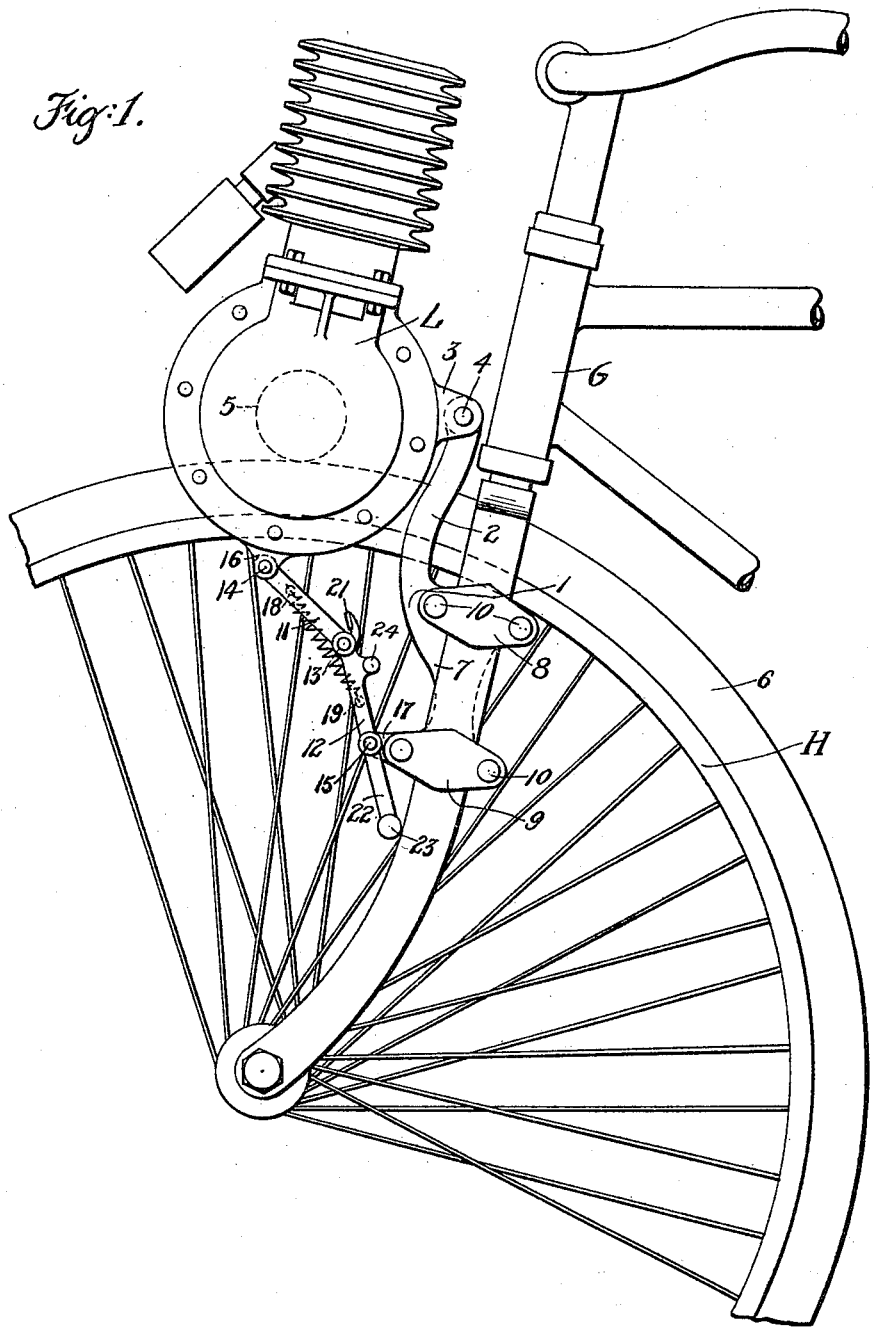
Figure 1 is a side elevational view of a mechanism constructed in accordance with the provisions of this invention, the same being illustrated in operative position upon the front forks of a bicycle frame.

Referring to the illustrations in the drawing for describing in detail the structure shown, the reference character L indicates the engine or motor, and G the bicycle frame. The motor L is connected to the frame G by means of a clamp 1 which engages about one or both of the forks of the frame and which is provided with an extension 2 constituting a pivotal mounting for the motor, the motor being formed with a lug 3 and being connected to the upper end of the extension 2 by a pivot pin 4, so that the motor is free to swing in a vertical plane about the pivot pin. The drive pulley 5 of the motor is thus adapted to be moved into and out of engagement with the upper surface of the tire 6 of the bicycle wheel H. The clamp 1 is preferably formed with a base plate 7 which lies upon one side of the bicycle fork and with a pair of clamp plates 8 and 9 which engage against the opposite side of the fork at spaced points, one above the other, said clamp plates being connected to the base plate by means of suitable screws or bolts 10. A strong substantial support is thus given to the pivot pin 4.

The toggle links are indicated at 11 and 12. These are pivotally connected together as at 13. The link 11 is pivotally connected to the motor casing, as at 14, and the link 12 is pivotally connected to the clamp member 1, as at 15. The pivotal connection at 14 is preferably formed through a lug 16 cast upon the engine casing, and the pivotal connection at 15 is preferably formed upon a lug 17 projecting forwardly from the base plate 7 and the clamp member 1.

Lugs 18 and 19 project laterally from the links 11 and 12 respectively and a heavy tension spring 20 is connected to said lugs so as to produce a normal tendency to buckle the links and cause the pivot 14 to move downwardly toward the fixed pivot 15. One of the links, as 12, is provided with an extension shoulder 21 for engaging the other link to retain the links against buckling in one direction. The shoulder 21 is arranged so as to permit the links to pass just slightly beyond a straight line so that the tendency of the spring to buckle the links will press the shoulder against the link 11 and cause the parts to be held against accidental displacement.

When the links are in their straightened condition the pivot 14 is in its highest elevated position and the guide pulley 5 is held upwardly out of engagement with the wheel tire, but when the links are moved in the opposite direction the spring draws the pivot 14 downwardly and forces the drive pulley into engagement with the wheel tire.

In order that the toggle links may be readily controlled by the rider's foot, one of said links, as the link 12, is provided with an extension 22 beyond the pivot 15, said extension having a lug 23 formed at its end to be engaged by the rider's foot. A similar lug 24 is formed upon the same link adjacent the pivot 13 also to be engaged by the rider's foot and these two lugs constitute a foot treadle by means of which the toggle links may be readily thrown into either of their positions. They also incidentally constitute an appropriately placed foot-rest for the rider's foot.

Of course, the mechanism described may be applied to only one of the bicycle forks, but if desired, it may be applied to both forks in which instance an appropriate rest is provided for both the rider's feet. If a toggle mechanism is arranged only at one side, then any other appropriate rest may be provided at the other side for the rider's remaining foot.

It will be, of course, understood that the clamping member 1 provides means whereby the entire mechanism may be adjusted bodily vertically with respect to the wheel so as to dispose the drive pulley 5 in the most effective operative position. In this connection it may be noted that in applying the device to a bicycle the toggle links are arranged in their straightened position and the clamp member 1 is adjusted to dispose the drive pulley 5 about a quarter of an inch above the upper surface of the wheel tire and the clamp screws 10 are screwed tight. When the toggle links are then bowed the drive pulley will fall against the wheel tire and may be raised to its original elevated position when the toggles are again straightened.

By the use of this invention it is apparent that the driving power of the motor may be entirely disconnected from the bicycle wheel at any moment desired, and as quickly returned. Coasting may be readily participated in by disconnecting the motor from the wheel and cutting off the power of the motor. While the power of the motor is cut the motor may be used as a brake upon the wheel at an instant's notice.

Other advantages will be apparent to those skilled in the art.

Having thus described my invention what I claim as new and desire to secure by Letters Patent is:

1. In a device of the class described, the combination with a vehicle wheel and frame and a motor having a drive pulley adapted to engage the wheel, of toggle mechanism operable to move the drive pulley into and out of engagement with the wheel at will, and a spring for urging the toggle into one of its positions.

2. In a device of the class described, the combination with a vehicle wheel and frame and a motor having a drive pulley adapted to engage the wheel, of toggle mechanism operable to move the drive pulley into and out of engagement with the wheel at will, and a spring having its opposite ends connected to the links of the toggle to resiliently retain said links in either of their positions.

3. A device of the class described, comprising a motor having a drive pulley adapted to engage a vehicle wheel for driving said wheel, toggle link mechanism for moving the drive pulley into and out of engagement with the wheel, and resilient means comprised in said toggle link mechanism operable when the links of the toggle mechanism are in one of their positions to urge the drive pulley into engagement with the wheel.

4. A device of the class described, comprising a motor having a drive pulley adapted to engage a vehicle wheel for driving said wheel, toggle link mechanism for moving the drive pulley into and out of engagement with the wheel, resilient means comprised in said toggle link mechanism operable when the links of the toggle mechanism are in one of their positions to urge the drive pulley into engagement with the wheel, and being also operable when the links of the toggle mechanism are in their other position to maintain the said links in said other position and hold the drive pulley out of engagement with the wheel.

In testimony whereof I affix my signature in the presence of two witnesses.

RALPH E. BATES.

Witnesses:
MORRIS WARBERG,
EMMA WEINBERG.